United States Patent
McLaughlin et al.

(10) Patent No.: US 11,520,299 B2
(45) Date of Patent: Dec. 6, 2022

(54) SHARED DATA CENTER BASED INDUSTRIAL AUTOMATION SYSTEM FOR ONE OR MULTIPLE SITES

(71) Applicant: HONEYWELL INTERNATIONAL, INC., Morris Plaines, NJ (US)

(72) Inventors: Paul Francis McLaughlin, Ambler, PA (US); James Michael Schreder, Perkasie, PA (US); Jason Thomas Urso, Houston, TX (US); David Barry Granatelli, Lilyfield (AU)

(73) Assignee: Honeywell International Inc., Charlotte, NC (US)

(*) Notice: Subject to any disclaimer, the term of this patent is extended or adjusted under 35 U.S.C. 154(b) by 45 days.

(21) Appl. No.: 16/370,913

(22) Filed: Mar. 30, 2019

(65) Prior Publication Data
US 2020/0310368 A1   Oct. 1, 2020

(51) Int. Cl.
G05B 13/04   (2006.01)
G05B 19/418   (2006.01)
G06F 9/455   (2018.01)
H04L 9/40   (2022.01)

(52) U.S. Cl.
CPC ......... *G05B 13/04* (2013.01); *G05B 19/4183* (2013.01); *G05B 19/4185* (2013.01); *G06F 9/45558* (2013.01); *H04L 63/107* (2013.01)

(58) Field of Classification Search
CPC .................................................. G07G 1/0018
See application file for complete search history.

(56) References Cited

U.S. PATENT DOCUMENTS

| | | | |
|---|---|---|---|
| 7,970,830 B2 | 6/2011 | Staggs et al. | |
| 8,327,017 B1* | 12/2012 | Trost | H04L 67/1031 370/220 |
| 9,218,000 B2 | 12/2015 | McLaughlin et al. | |
| 9,412,137 B2 | 8/2016 | McLaughlin et al. | |
| 9,733,627 B2 | 8/2017 | Pandurangan et al. | |
| 2004/0249922 A1* | 12/2004 | Hackman | H04L 12/2803 709/223 |
| 2013/0211546 A1 | 8/2013 | Lawson et al. | |
| 2015/0120010 A1 | 4/2015 | Hashimoto et al. | |
| 2016/0105644 A1* | 4/2016 | Smith | H04N 5/23206 348/159 |
| 2017/0012778 A1* | 1/2017 | Choyi | H04L 9/0861 |
| 2017/0289184 A1* | 10/2017 | C | H04L 63/1425 |
| 2018/0004180 A1 | 1/2018 | Kar et al. | |
| 2018/0059629 A1 | 3/2018 | Haridas et al. | |
| 2018/0119975 A1* | 5/2018 | Park | G06Q 10/063 |
| 2019/0197879 A1* | 6/2019 | Raji | H04L 12/10 |
| 2021/0092007 A1* | 3/2021 | Danilchenko | H04L 43/0811 |

* cited by examiner

*Primary Examiner* — Nathan L Laughlin
(74) *Attorney, Agent, or Firm* — Paschall & Associates, LLC; James C. Paschall

(57) ABSTRACT

A system includes a shared data center having at least one data storage unit and at least one processing unit. The shared data center is configured to service one, two, or more industrial automation systems. For each of the one, two, or more industrial automation systems, the shared data center is configured to receive process-related data associated from at least one local device in at least one local system, analyze the process-related data from the local device, and provide instructions to at least one client device associated with the local system.

20 Claims, 5 Drawing Sheets

SHARED DATA CENTER BASED INDUSTRIAL AUTOMATION SYSTEM FOR ONE OR MULTIPLE SITES

TECHNICAL FIELD

This disclosure relates generally to computer systems and, more specifically, to the use of shared data center computing in industrial process automation applications, and systems and methods related to the use of shared data center computing in industrial applications.

BACKGROUND

Shared data center computing allows for the moving of applications, services and data from field units and desktop computers back to a facility of networked computers, servers, and storage. The shared data center may be on or off premises and be implemented as a service. By relocating the execution of applications, deployment of services, and storage of data, shared data center computing offers a systematic way to decrease capital expenses, decrease operating expenses, improve reliability and availability, centralize information, enhance robustness, and improve cyber security. The shared data center provides services to at least a first industrial automation system and at least a second industrial automation system. A single shared data center may operate across multiple industrial plant sites. The advantages may be achieved while allowing for an owner to use its own shared data center which provides greater oversight and less risk as data does not leave the owner's domain. Furthermore, the advantages still may be achieved in situations where it is prohibited for data to cross a geographical border.

SUMMARY

This disclosure provides a system and method for using shared data center computing in applications that cover one, two, or more industrial automation systems.

In a first embodiment, a system includes a shared data center comprising at least one data storage device and at least one processing device. The shared data center is configured to provide shared services to one, two, or more industrial automation systems. For each of the one, two, or more industrial automation systems, the shared data center is configured to receive process-related data from at least one local device in a local system where the process-related data is associated with an industrial process; analyze the process-related data from the local device; provide instructions to at least one client device associated with the local system. The system may also comprise physical security restricting access to the shared data center. The system may be further configured to implement system security updates.

In other embodiments, the system provides information relating to a client device on demand to the client device. In further embodiments, a client device may be configured to connect to the system through a local bus connection. In yet other embodiments, the at least one data storage device and or the at least one computer processing device service the at least one, two, or more industrial automation systems while in still other embodiments the at least one data storage device and or the at least one computer processing device service are in dedicated service to a first industrial automation system and at least a second data storage device and or a second computer processing device is dedicated to service a second industrial automation system. In another embodiment the shared data center is further configured to align with a management system for management, audit, optimization or support of the one, two, or more industrial automation systems. In another embodiment the computer processing device is a virtual machine, or the shared data center further comprises at least one virtual machine. In still another embodiment, the client device associated with the local system comprises a controller, sensor, or computer configured to control or collect data associated with industrial equipment. In another embodiment the shared data center is configured for expansion of at least one industrial control system of the one, two, or more industrial control systems.

In a second embodiment, a method includes receiving segregated data from at least one process device in each of one, two, or more industrial processes, the segregated data relating to a corresponding industrial automation system in a set of one, two, or more industrial automation systems, by a shared data center comprising at least one data storage device and at least one computer processing device wherein the shared data center is configured to provide shared services to the set of one, two, or more industrial automation systems, analyzing the segregated data from the at least one process device in each of the one, two, or more industrial processes; and instructing a first process client associated with the first industrial automation system, based on the analysis of the data relating to the first industrial automation system and instructing, based on the analysis of the segregated data, a process client associated with each corresponding industrial process and corresponding industrial automation system. In another embodiment, the method may comprise updating the industrial automation systems with system security updates. In another embodiment, the method may comprise restricting physical access to the shared data center. In another embodiment, the method may comprise managing the industrial automation systems using a management system aligned with the shared data center. In another embodiment, the receiving segregated data from at least one process device in each of one, two, or more industrial processes and the instructing, based on the analysis of the segregated data, a process client associated with each corresponding industrial process and corresponding industrial automation system occur using a secure connection. The secure connection may be a file transfer protocol secure connection.

In a third embodiment, an apparatus includes a shared data center computing apparatus comprising a least one network interface configured to provide a service bus connection enabling a Service Oriented Architecture (SOA) service; at least one data storage device configured to provide shared storage space to one, two, or more industrial automation systems through the service bus connection; and at least one processing device configured to provide functional services to a corresponding industrial automation system of the one, two, or more industrial automation systems through the service bus connection; wherein the apparatus is configured to provide the functional services based upon one or more specified criteria.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
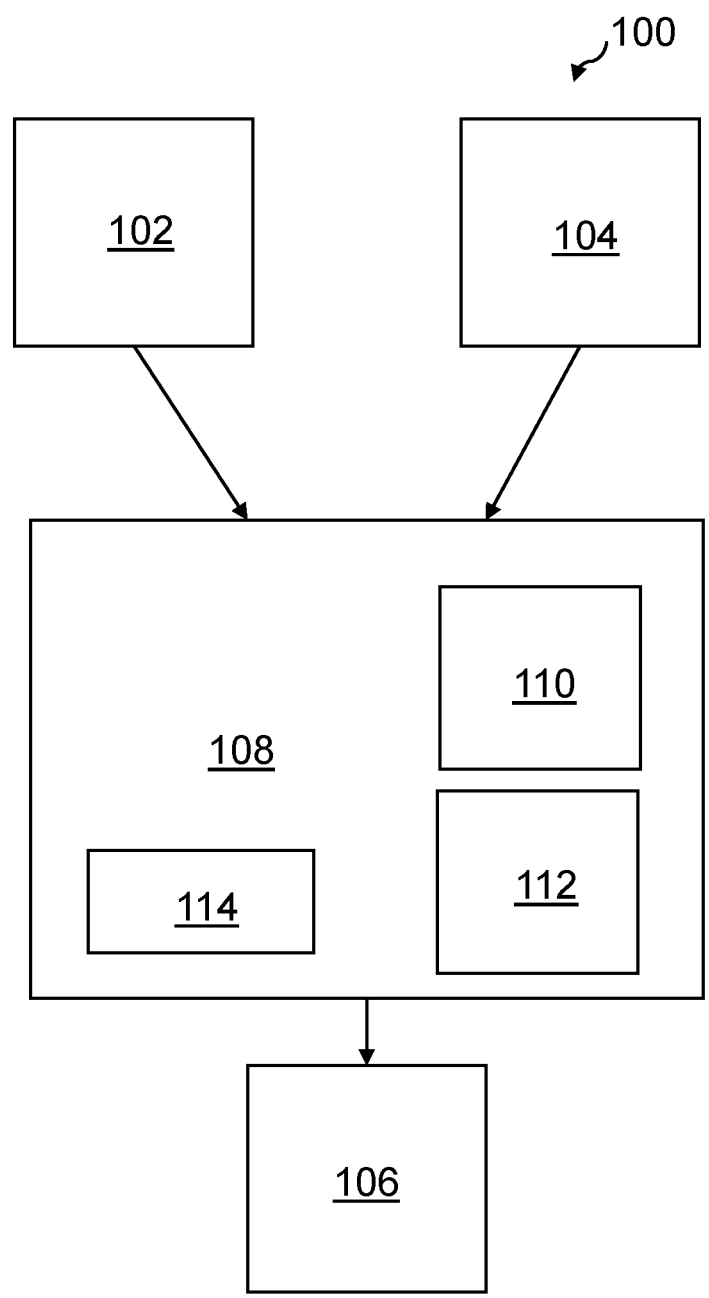
FIG. 1 illustrates an exemplary shared data center environment according to this disclosure.

FIG. 1 illustrates an example system 100 according to this disclosure. FIG. 1 shows clients 102, 104, and 106 connected to a shared data center 108. Shared data center 108 comprises processing unit 110 and data storage unit 112, both of which are accessible to clients 102, 104, and 106. Clients 102 and 104 are associated with a first industrial automation system. Client 106 is associated with a second industrial automation system. Additional industrial automation systems may be included but are not shown in FIG. 1. Shared data center 108 may also comprise security 114 which may include physical security or system security or both.

Shared data center 108 contains equipment to support one, two, or more independent industrial automation systems. In one embodiment, the shared data center supports a single industrial automation system. In another embodiment the shared data center supports two or more industrial automation systems. FIG. 1 shows two independent industrial automation system, although it is understood that a single industrial automation system may be supported, or more than two independent industrial automation systems may be supported as well.

In the embodiment where two or more industrial automotive systems are supported by the shared data center, computing power may be shared between servicing the a industrial automation system and servicing a second industrial automation system. Since equipment supporting multiple different industrial automation systems are housed in a common facility, the shared data center supporting two or more industrial automation systems may have dedicated information technology personnel to support and maintain the systems in the shared data center 108. The information technology personnel dedicated to supporting the information technology equipment and systems in the shared data center may be responsible for monitoring, patching, trouble shooting, repairing, maintaining, and refreshing the equipment and systems in shared data center 108. Operators at an industrial plant site, or at the shared data center are then relieved of these information technology-related duties allowing operators to focus on their primary responsibilities such as plant operations and the manufacturing mission. Further, consolidating two or more industrial automation systems into a shared data center allows for a set of operators or a set of information technology staff to support and manage multiple industry automation systems. Multiple sets of operators or information technology staff may be consolidated in the shared data center. Efficiency is improved, and operating expenses are reduced. Shared data center 108 may also eliminate the need for a physical control center at one or more industrial plant locations thereby reducing infrastructure costs. Using shared data center 108 may eliminate the need for network switches and cables.

In the embodiment where a single industrial automation system is supported by the shared data center, the data center is located geographically remote from the industrial process. The ability to remotely locate the data center from the industrial process has advantages. The remote location may be more accessible, have greater security measures, be in a lower risk environment, have greater environmental and utility controls, and the ability for future expansion.

Physical and system security 114 is also improved though shared data center 108. Shared data center 108 may be equipped with physical security measures such as fences, locks, access control card systems, security personnel, cameras, cages, biometric access control systems, heat sensors, surveillance systems, sensors, identification systems and procedures, and other physical security measures, represented as 114. These physical security measures may be cost prohibitive to provide for an industrial automation system at every individual location where data is obtained, such as the individual clients. But when combined with equipment supporting other industrial automation systems in a single location, the cost of physical security is conserved and a greater degree of physical security for all systems of the shared data center may be achieved.

System security is likewise improved though shared data center 108 since dedicated data center personnel can integrate the equipment for industrial automation support of multiple systems in shared data center 108 into routine security upgrading, updating, and patching operations useful for all equipment in the shared data center. Shared data center 108 facilitates easier and more frequent security upgrading, updating, and patching than can be obtained if such operations were conducted at each individual location where data is obtained, such as the individual clients, or at a local control center limited to only a single industrial automation system. The system security may be applied to one or to multiple industrial automation systems serviced by the shared data center 108. The shared data center may be configured to implement system security updates including patches directed to the industrial automation systems as needed, on a scheduled time interval, or both.

Furthermore, in a highly distributed system, security can become challenging with a higher potential for breaches due to more people physically able to interact with the system. In a shared data center, the end user or owner of the shared data center has the ability to dramatically reduce and the control the number of people with physical access to the system and thereby enhance the security of the system.

The one, two, or multiple industrial automation systems may be associated with industrial processes located in separate location(s) which are remote from the shared data center. In the embodiment where a single industrial automation system is serviced by the shared data center, the shared data center is located remotely from the industrial process. In another embodiment, the shared data center may be located at the same site where at least one of the industrial processes is located with at least one of the industrial automation systems being on site with the industrial processes. In still another embodiment, the shared data center involves industrial automation systems where the industrial process is remote from the shared data center and additional industrial automation processes where the industrial process is at the same location as the shared data center. A particular example might be situations where there are off-shore and on-shore processes. The industrial automation systems may involve industrials processes of various risk levels. The industrial automation systems may apply to different industry segments.

The shared data center provides for efficiency and cost reduction while at the same time preserving the autonomy of each of the multiple industrial automation systems co-located within the shared data center. For example, the infrastructure employed at the shared data center would have segregation so that, where important, the different industrial automation systems do not affect one another. It may be important that the multiple industrial automation systems, or any one of the multiple industrial automation systems, do not have a common mode fault. Segregation would be employed to prevent a common mode fault situation. Virtualization infrastructure, which can be used in the shared data center, facilitates the necessary segregation. For example, various functions are replicated where needed so that if one section of the infrastructure happens to fail, the system may restart that function or use a replicate to take over the function.

Another way to segregate different sections of the industrial automation system is to take advantage of multiple host environments that may be employed in the infrastructure. For instance, half of a set of functions (e.g. controls, operational displays, data collection) are located on a first host environment and a second half of the functions are located on a second host environment. In that way, should a failure occur, the entirety of the function is not lost. The infrastructure and the networking of the industrial automation system may be used to provide the segregation to eliminate a single point of failure. In a specific example, the operator interfaces are spread across various host environments running the data center so that if one operator interface fails, the remaining operator interfaces continue to function. Access to the failed operator interface may temporarily be suspended, but the whole function has not failed. In the shared data center, the numbers of redundancies of infrastructures may be reduced as compared to having the same pattern of redundancies of infrastructures replicated for each of a set of multiple on-site control rooms thereby accomplishing what would otherwise be cost prohibitive in the case of multiple different on-site control rooms.

To further eliminate a potential common fault mode, the highly available redundant network of an on-site system would now reach into the shared data center and the networking itself should be distributed to remain available. The physical routing of first network may be in isolation from other networks. Further, it is advantageous to tunnel or encapsulate the availability messages over the networking between the local site and the shared data center. Network topology is designed to allow for the routing or tunneling of the messages to the shared data center.

At a focused level of operation, each multiple industrial automation system can be managed separately and do not have a common mode fault, but at a higher level, the overall common infrastructure and management and care of the aggregate of multiple industrial automation systems can be handled collectively and achieve efficiency and cost saving. Availability messaging in the industrial automation systems may be improved by the shared data center since operators and systems are managing just one overarching operation instead of a large number of operations. Managing one system can be more efficient that separately managing a host of systems.

Shared data center 108 is a computing system that is capable of both storing information and performing data functions on information. The shared data center comprises at least one processing unit or computer that is accessible from a remote location. The computer processing device may be a virtual machine, or the shared data center may comprise at least one virtual machine. The shared data center 108 may comprise a plurality of storage devices that will be referred to as collectively the storage unit 112, as well as a plurality of processing units that will be referred to collectively as the processing unit 110. In one embodiment the same processing unit 110 and data storage unit 112 are used in support of the industrial automation system as well as one or more other corporate systems. In another embodiment different dedicated processing unit 110 and or data storage unit 112 may be used in support of different systems. The data center 108 may comprise hardware that is cost prohibitive to deploy and maintain at individual clients 102, 104, and 106. In shared data center 108, with hardware shared among multiple systems including an industrial automation system, expansion of any one system such as the industrial automation system, may be achieved without acquiring additional hardware thus conserving capital resources. Further, the expansion may be readily and quickly accomplished using hardware already present in the shared data center 108.

In addition, the shared data center 108 may comprise software that is cost prohibitive to install, deploy, and maintain at individual clients or even individual dedicated data centers. Shared data center 108 may provide hardware and software through secure connections or unsecure connections to clients 102, 104, and 106. In one embodiment, a secure connection employed is a file transfer protocol secure connection. While there is one data center 108 shown in FIG. 1, it is explicitly understood that a plurality of data centers may be consistent with this disclosure.

Clients 102 and 104 are local devices, controllers, or computers of a first industrial automation system located at the industrial plant sites or operational locations that are in communication with the shared data center 108 and that control the operation and services for the plant site. Client 106 is a device associated with a second industrial automation system. Clients 102, 104 are capable of accessing both the processing unit 110 and storage unit 112 that are located in the shared data center 108. Clients 102 and 104 may comprise a plurality of industrial automation tools and sensors to monitor industrial process operations. These sensors may detect any operational condition of the industrial process, including, but not limited to, the temperature, pressure, vibration, or other measurable operating parameter. Client 106 may be as described for clients 102 and 104, but in relation to a second industrial automation system serviced by the shared data center 108. Following this same pattern, additional clients related to additional industrial automation systems serviced by the shared data center may also be present.

Clients 102, 104, and 106 communicate with the shared data center 108 through any secured or unsecured method, including Hypertext Transfer Protocol Secure (HTTPS), secure telnet, or file transfer protocol secure (FTPS). It is understood that secure methods may be preferred over unsecure methods, and that the particular method chosen will depend upon the requirements of the function being accessed. This disclosure should not be interpreted as being limited to any particular protocol or method of transferring data.

It is understood that the communication between clients 102-106 and shared data center 108 may be unidirectional or bidirectional. The phrase "unidirectional communication" refers to communication in which data is sent from in one direction by any number of devices. The term "bidirectional communication" refers to communication where data is sent and received by any number of devices. Further, the shared data center may be configured to provide trend displays, alarms, event summaries, and event archives based on the process-related data to the client device. Data and instructions communicated may be segregated so that data and instructions related to one industrial automation system are not provided to another industrial automation system.

In some embodiments, shared data center 108 may leverage a Service Oriented Architecture (SOA) to abstract consumers of shared data center services from the location services themselves. When a shared data center user at a given client invokes a function, that function could be redirected to components running on a server in the shared data center 108. This redirection is performed by a service bus that exposes a set of service endpoints to users who interact with these services as if the services were local. The service bus directs requests for those services to the appropriate service providers either locally or in the data center based on configured mapping. Mapping can be done on a per service basis, allowing a mix of local and data center-based services to be used. The service bus itself could be local to the plant or also located in the data center. The disclosed systems and methods can be designed for multi-tenancy, such that many companies can share the same physical database resources but keep their respective data entirely private. Alternatively, the disclosed systems and methods can be designed for single tenancy for greater oversight and control of the tenant's data. Risk associated with data leaving the owner/operator's domain is avoided. Even with single tenancy, data originating at multiple plant locations of the tenant may be handled at shared data center 108. Clients associated with shared data center 108 may be selected to maintain all data within a defined geographical region in order to comply with local regulations.

The system allows for a very flexible architecture where all, some, or no computer equipment or server equipment is located at the physical plant site for the industrial automation systems serviced by the shared data center. Examples of suitable architecture types include, Service Oriented Architecture, EXPERION Virtual Engineering Platform from Honeywell International Inc., Open Virtual Engineering Platform, EXPERION DSA technology from Honeywell International, Inc., island-mode remote auxiliary stations, remote fault tolerance ethernet (FTE) process control network capability, rebust/secure control communications, IO Mesh architecture, and Control Mesh architecture.

Referring to the industrial automation systems serviced by the shared data center, suitable topologies include where all computer and server nodes are on the plant site such as current distributed system architecture (DSA) systems. Mixed systems where some computer equipment is on site at the physical plant with the balance of computer and server equipment and applications being located at the data center may also be used. For example, operator console stations may be located on site at the physical plant where historians, data servers, SCADA collectors, domain controllers, asset management software, alarm management software, are located in the data center. Another topology includes where all computer and server hardware and applications are located in the data center with embedded nodes and thin-client operator stations being on site with the embedded distributed control system (DCS) controllers. Yet another suitable topology includes where all computer and server equipment are located in the data center along with virtual DCS controllers and the equipment on site at the physical plant is Mesh 10 hardware and devices. A single data center supporting multiple sites with distinct control systems may also be employed with any combination of the above topologies. DSA may be used at the data center to integrate multiple servers each with its own per site Engineering Repository.

Again referring to the industrial automation systems serviced by the shared data center, a hybrid approach may be used when supervising the control of a process at a remote industrial plant including providing a service or collecting data. Some features of the clients 102, 104 and/or 106 can be better performed by the shared data center 108 than at the client 102, 104 and/or 106. By determining which functions can be performed more efficiently in the shared data center 108 than at the local client 102, 104 and/or 106, computing resources can be allocated in such a way as to maximize performance. It is understood that this hybrid approach allows a plurality of applications including, but not limited to, applications that promote operator advanced functions (alarm analysis and reconfiguration), batch execution, simulation, or other applications.

Figure 2:
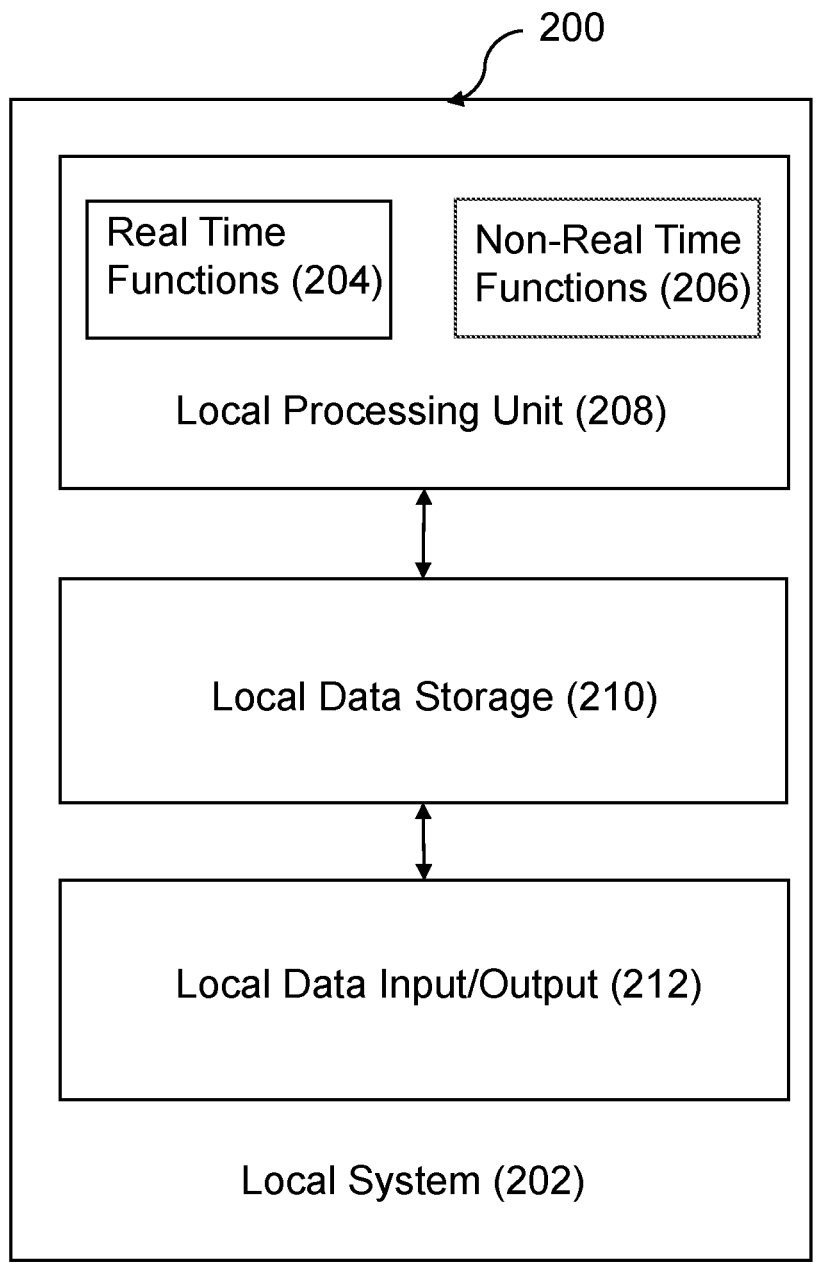
FIG. 2 illustrates an exemplary local system environment according to this disclosure.

FIG. 2 is an illustration 200 of an exemplary local system 202 at an industrial plant site. Each client 102 and 104 comprises a local system 202. The local system 202 comprises a local processing unit 208, a local data storage 210, and a local data input/output 212. The local processing unit 208 may comprise both real time functions 204 and non-real-time functions 206.

Real time functions are those functions that instruct or control other devices, including the actual mechanical systems used in a factory, or provide data to personnel who are operating those mechanical systems. These real time functions are generally always required to be available, and may be designed to be non-resource intensive. An example of these real time functions may include the programming of a basic automated system to perform a specific function (e.g., drill into a substance) for a specific time. The phrase "real time" is intended to refer the requirement that the data created by a real time function be available upon demand from the actual mechanical systems or personnel who are operating the mechanical systems.

Another advantage of the presently disclosed systems and methods is the ability to rapidly deploy new services or features to a plurality of clients without the need to make changes to the clients themselves. As a new service becomes available (e.g., an advanced analysis tool becomes available), this service may be offered to improve the manufacturing process at a given site without the need for reprogramming at the site. One or more of the industrial automation systems receive deployment of new services or features, but it not required that all industrial automation systems be included.

Yet another advantage of the presently disclosed systems and methods is the use of a partition model within the shared data center 108. The partition model allows the shared data center to determine what data should be stored by the local system 202, the shared data center 108, and both the local system 202 and the shared data center 108. In addition, by awareness of the location of the data within the partition mode, data reliability and consistency can be maintained.

Figure 3:
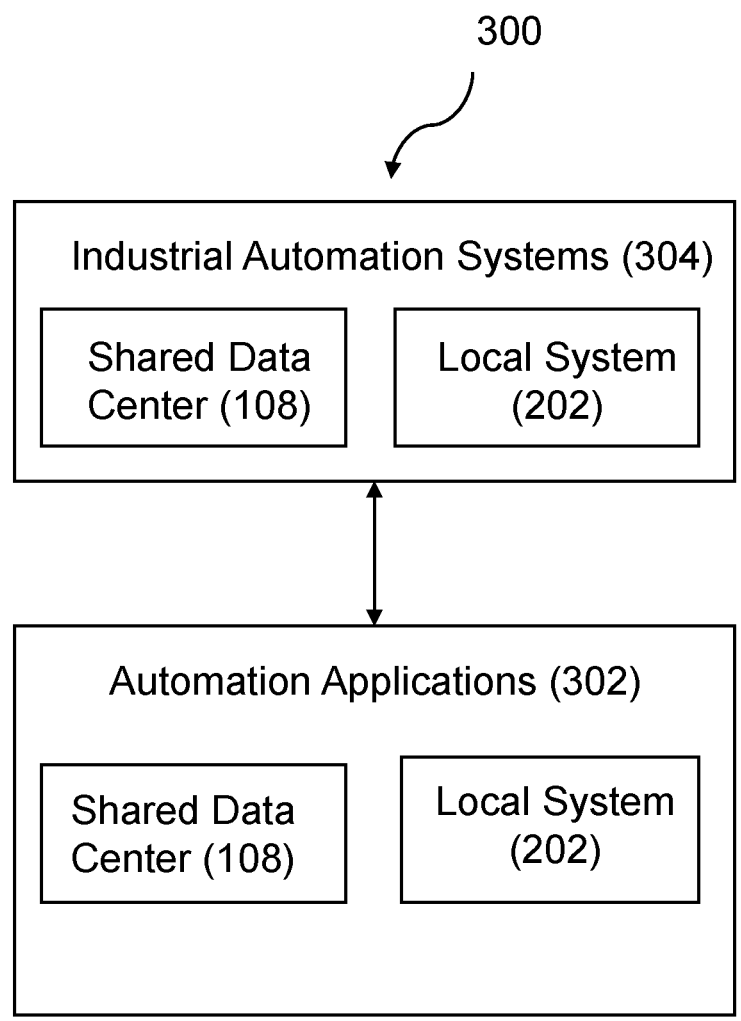
FIG. 3 illustrates an exemplary industrial automation system and applications according to this disclosure.

FIG. 3 illustrates an industrial automation systems and automation applications 300 according to this disclosure. In this example, 300 includes industrial automation systems 304 and automation applications 302 where both are distributed across the shared data center 108 and the local system 202. The industrial automation systems 304 and automation applications 302 may include multiple local systems 202 and multiple shared data centers 108. Both the industrial automation systems 304 and the automation applications 302 may use the techniques described in this disclosure to support the use of shared data center computing in a more effective manner.

Figure 4:
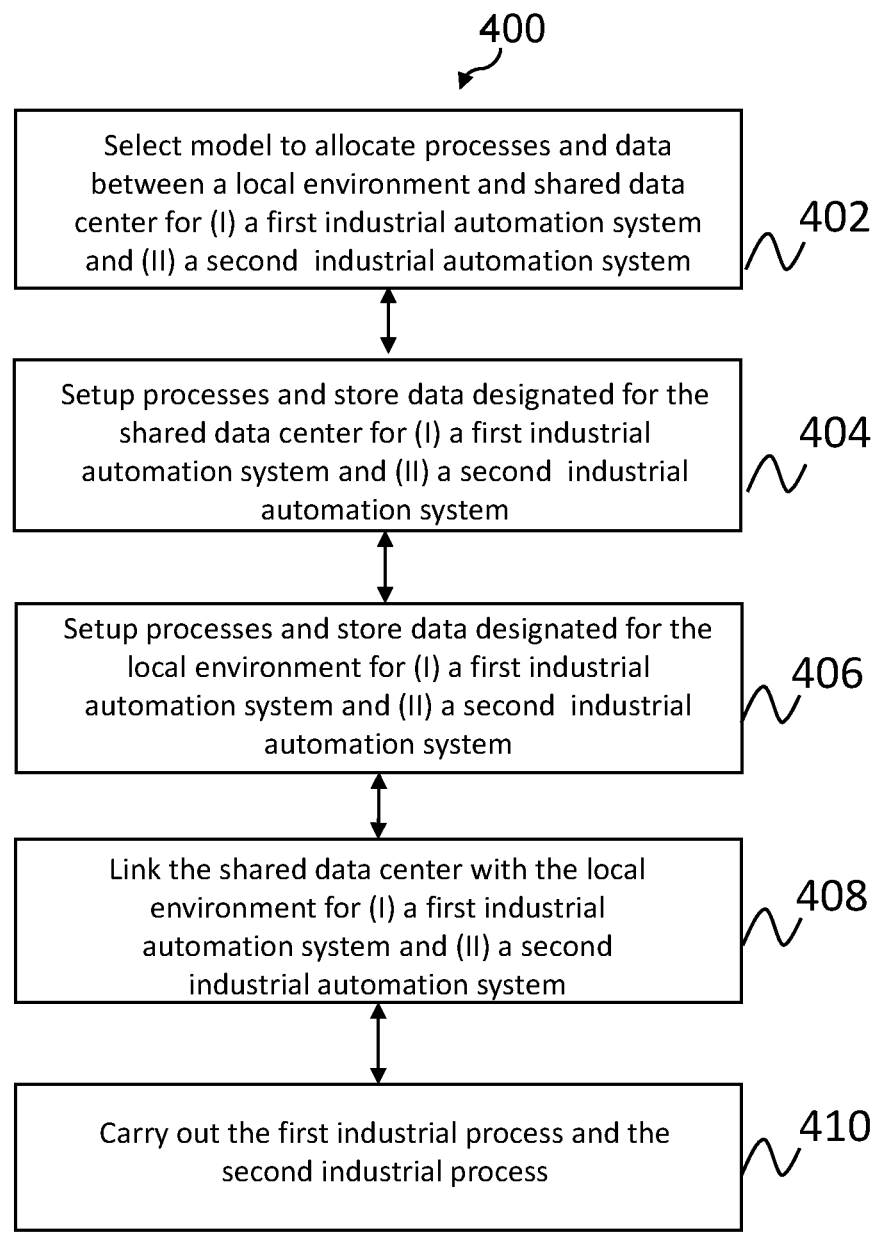
FIG. 4 illustrates an exemplary method of allocating processes and data according to this disclosure.

FIG. 4 is an example method 400 of allocating processes and data between the local environment 202 and the shared data center 108 in block 402 for both a first and a second industrial automation system. In block 404, the processes for the data center are setup, and data is stored in the shared data center for both a first and a second industrial automation system. In block 406, the processes for the local environment are setup, and data is stored in the local environment for both a first and a second industrial automation system. In block 408, the shared data center 108 is linked to the local environment 202 for both a first and a second industrial automation system. In block 410, the first and second industrial processes are carried out using the data and processes in both the shared data center 108 and the local environment 202.

Another benefit of the shared data center approach is that data from multiple local systems and potentially from multiple companies is stored in a single location where it can be used for analysis such as performance benchmarking.

In one embodiment, local collectors and other devices would aggregate data in one or more systems, and these systems can be in the same or diverse geographic areas. Shared data center services would then collect, analyze, and inform based on this data.

Figure 5:
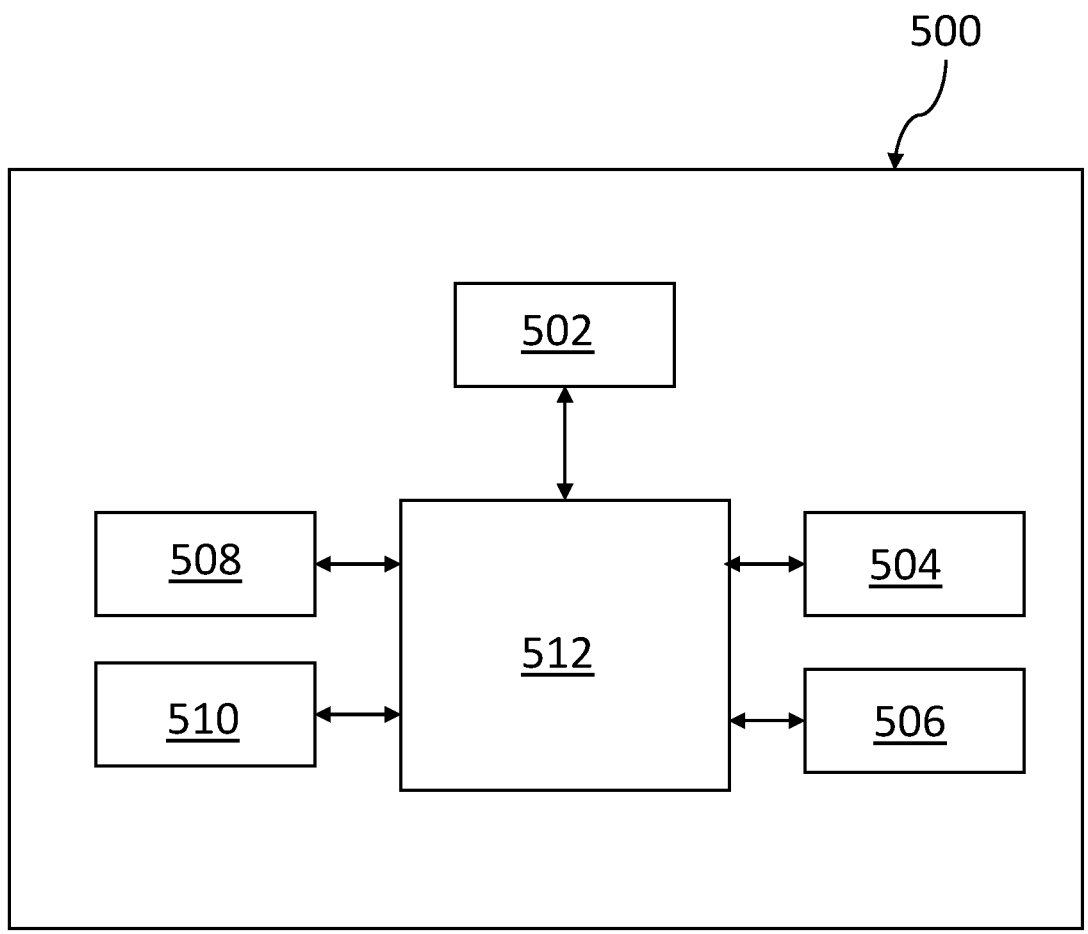
FIG. 5 illustrates an exemplary computer system supporting shared data center computing according to this disclosure.

FIG. 5 illustrates an example computer system 500 supporting shared data center computing according to this disclosure. Shared data center 108 and elements of the local environment 202 described above may be implemented on any general-purpose computer 500 with sufficient processing power, memory resources, and network throughput capability to handle the necessary workload placed upon it. A consumer home personal computer, networked to shared data center 108 through a wide area network, such as the Internet, may be used in conjunction with the disclosed embodiments. The consumer home personal computer may share some, or all, of the elements of shared data center 108. FIG. 5 illustrates a typical, computer system suitable for implementing one or more embodiments disclosed herein. The general-purpose computer 500 includes a processor 512 (which may be referred to as a central processor unit or CPU) that is in communication with memory devices including secondary storage 502, read only memory (ROM) 504, random access memory (RAM) 506, input/output (I/O) 508 devices, and network connectivity devices 510. The processor may be implemented as one or more CPU chips.

The secondary storage 502 is typically comprised of one or more disk drives or tape drives and is used for non-volatile storage of data and as an over-flow data storage device if RAM 506 is not large enough to hold all working data. Secondary storage 502 may be used to store programs that are loaded into RAM 506 when such programs are selected for execution. The ROM 504 is used to store instructions and perhaps data that are read during program execution. ROM 504 is a non-volatile memory device that typically has a small memory capacity relative to the larger memory capacity of secondary storage. The RAM 506 is used to store volatile data and perhaps to store instructions. Access to both ROM 504 and RAM 506 is typically faster than to secondary storage 502.

I/O 508 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 510 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 510 may enable the processor 512 to communicate with an Internet or one or more intranets. With such a network connection, it is contemplated that the processor 512 might receive information from the network or might output information to the network in the course of performing the above-described functions. Such information, which is often represented as a sequence of instructions to be executed using processor 512, may be received from and outputted to the network, for example, in the form of a computer data baseband signal or a computer data signal embodied in a carrier wave. The baseband signal or signal embodied in the carrier wave generated by the network connectivity devices 510 may propagate in or on the surface of electrical conductors, in coaxial cables, in waveguides, in optical media such as optical fiber, or in the air or free space. The information contained in the baseband signal or signal embedded in the carrier wave may be ordered according to different sequences as may be desirable for either processing or generating the information or transmitting or receiving the information. The baseband signal or signal embedded in the carrier wave or other types of signals currently used or hereafter developed (referred to as the "transmission medium") may be generated according to several methods well known to one skilled in the art.

Such information, which may include data or instructions to be executed using processor 512 for example, may be received from and outputted to the network, for example, in the form of a computer data baseband signal or signal embodied in a carrier wave. The baseband signal or signal embodied in the carrier wave generated by the network connectivity devices 510 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 512 executes instructions, codes, computer programs, scripts that it accesses from hard disk, floppy disk, optical disk (these various disk based systems may all be considered secondary storage 502), ROM 504, RAM 506, or the network connectivity devices 510.

Although the figures above have illustrated various details regarding the use of shared data center computing in industrial application, various changes may be made to these figures. For example, the functional divisions shown in various figures are for illustration only. Components in a device, system, or environment could be combined, omitted, or further subdivided or additional components could be added according to particular needs. While shown as a series of steps, various steps in FIG. 4 could overlap, occur in parallel, occur in a different order, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

In one embodiment, the shared data center is further configured to provide shared services to a non-industrial-automation system. In this embodiment, shared data center 108 contains equipment to support the industrial automation systems as described above and further contains equipment support to at least one other common company function such as finance, accounting, tax, legal, procurement, sales, engineering, human resources, communications resources, and the like. Computing power may be shared between servicing industrial automation systems and servicing a non-industrial-automation system. Advantages of housing multiple systems in a common facility as discussed above are further extended to include supporting corporate function systems. Where the shared data center additionally services a non-industrial-automation system, the same personnel dedicated to supporting the information technology equipment and systems in the shared data center supporting industrial automation systems may also be responsible for monitoring, patching, trouble shooting, repairing, maintaining, and refreshing the equipment and systems in shared data center 108 that is used to additionally support at least one non-industrial-automation system. Efficiency is improved, and operating expenses are reduced.

In this embodiment, a method would comprise receiving data relating to (I) a first industrial automation system associated with at least a first process device; and (II) a second industrial automation system associated with at least a second process device, and (III) a non-industrial-automation system associated with a device; by a shared data center comprising at least one data storage device and at least one computer processing device wherein the shared data center is configured to provide shared services to at least the first industrial automation system, the second industrial automation system and the non-industrial-automation system. The method would continue with analyzing the data relating to the first industrial automation system associated with the first process device; analyzing the data relating to the second industrial automation system associated with the second process device; and analyzing the data relating to the non-industrial-automation system associated with the device. Finally, the method includes instructing a first process client associated with the first industrial automation system, based on the analysis of the data relating to the first industrial automation system; instructing a second process client associated with the second industrial automation system, based on the analysis of the data relating to the second industrial automation system; and instructing another client associated with the non-industrial-automation system based on the analysis of the data relating to the non-industrial automation system.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:
1. A system comprising:
a shared data center comprising:
(i) at least one data storage device and at least one computer processing device;
(ii) wherein the shared data center is configured to provide shared services to one, two, or more industrial automation systems;
wherein, for each of the one, two, or more industrial automation systems, the shared data center is configured to:
a. receive segregated data from at least one local device of a local environment, the segregated data associated with an industrial process;
b. analyze the segregated data from the local device; and
c. allocate, using a partition model, the segregated data between the local environment and the shared data center for a first and a second industrial automation system;
d. determine, using the partition model, for the first and the second industrial automation system, a location of the segregated data and the segregated data to be stored in at least one of:
the local device of the local environment or the shared data center, and
both the local device and the shared data center;
e. link the shared data center to the local environment for both the first and the second industrial automation system; and
f. provide, based on the analysis of the segregated data, instructions to at least one client device associated with the local environment,
wherein the shared data center is further configured to allocate a plurality of computing resources to the first and the second industrial automation system based on an efficiency of functions associated with the shared data center, the first industrial automation system, and the second industrial automation system; and g. implement system security updates and patch operations location, on a scheduled time interval, for equipment associated with the first and the second industrial automation system located at a separate remote location, wherein the shared data center is further configured to reduce and control a number of operator with physical access to the system to enhance security of the system.

2. The system of claim 1 further comprising physical security restricting access to the shared data center.

3. The system of claim 1 wherein the shared data center is further configured to implement system security updates.

4. The system of claim 1 wherein the shared data center is further configured to implement system security updates for multiple industrial automation systems.

5. The system of claim 1 wherein the shared data center is further configured to implement system security updates for multiple industrial automation systems each industrial automation system associated with the industrial process located at the separate remote location.

6. The system of claim 1 wherein the shared data center is further configured to implement system security updates directed to the one, two, or more industrial automation systems and to at least one other system as needed, on the scheduled time interval, or both as needed and on the scheduled time interval.

7. The system of claim 1 wherein the at least one data storage device, the at least one computer processing device, or both service at least two of the industrial automation systems.

8. The system of claim 1 wherein the at least one data storage device and or the at least one computer processing device is in dedicated service to the first industrial automation system and at least a second computer processing device is dedicated to service the second industrial automation system.

9. The system of claim 1 wherein the shared data center is further configured to align with a management system for management, audit, optimization, or support of at least one of the industrial automation systems.

10. The system of claim 1 wherein the at least one computer processing device is a virtual machine, or the shared data center further comprises at least one virtual machine.

11. The system of claim 1 wherein at least one client device associated with a local system of the local environment comprises a controller, sensor, or computer configured to control or collect data associated with industrial equipment.

12. The system of claim 1 wherein the shared data center is configured for expansion of at least one of the industrial automation systems.

13. The system of claim 1 wherein the shared data center is further configured to provide shared services to at least one non-industrial-automation system.

14. A method comprising:

receiving segregated data from at least one process device of a local environment in each of one, two, or more industrial processes, the segregated data relating to a corresponding industrial automation system in a set of one, two, or more industrial automation systems, by a shared data center comprising at least one data storage device and at least one computer processing device wherein the shared data center is configured to provide shared services to the set of one, two, or more industrial automation systems;

analyzing the segregated data from the at least one process device in each of the one, two, or more industrial processes; and allocating, using a partition model, the segregated data between the local environment and the shared data center for a first and a second industrial automation system;

determining, using the partition model, for the first and the second industrial automation system, a location of the segregated data and the segregated data to be stored in at least one of:

the at least one process device of the local environment or the shared data center, and both the at least one process device and the shared data center;

linking the shared data center to the local environment for both the first and the second industrial automation system; and instructing, based on the analysis of the segregated data, a process client associated with each corresponding industrial process and corresponding industrial automation system, wherein the shared data center is further configured to allocate a plurality of computing resources to the first and the second industrial automation system based on an efficiency of functions associated with the shared data center, the first industrial automation system, and the second industrial automation system; and implementing system security updates and patching operations, on a scheduled time interval, for equipment associated with the first and the second industrial automation system located at a separate remote location, wherein the shared data center is further configured to reduce and control a number of operator with physical access to the industrial automation system to enhance security of the industrial automation system.

15. The method of claim 14 further comprising updating the industrial automation systems with system security updates.

16. The method of claim 14 further comprising restricting physical access to the shared data center.

17. The method of claim 14 further comprising managing the industrial automation systems using a management system aligned with the shared data center.

18. The method of claim 14 wherein the segregated data is received from at least one process device in each of the one, two, or more industrial processes and the instructing, based on the analysis of the segregated data, the process client associated with each corresponding industrial process and corresponding industrial automation system occur using a secure connection.

19. The method of claim 14 wherein receiving the segregated data further comprises receiving data from a non-industrial-automation system, analyzing the segregated data further comprises analyzing data relating to the non-industrial-automation system, and the instructing further comprises instructing a client associated with the non-industrial-automation system based on the analysis of the data from the non-industrial-automation system.

20. A shared data center computing apparatus comprising:

at least one network interface configured to provide at least one service bus connection enabling a Service Oriented Architecture (SOA) service;

at least one data storage device configured to provide shared storage space to one, two, or more industrial automation systems through the service bus connection;

at least one processing device configured to:
 receive segregated data from at least one local device of a local environment, the segregated data associated with an industrial process;
 analyze the segregated data from the local device;
 allocate, using a partition model, the segregated data between the local environment and the shared data center computing apparatus for a first and a second industrial automation system;
 determine, using the partition model, for the first and the second industrial automation system, a location of the segregated data and the segregated data to be stored in at least one of:
  the local device of the local environment or the shared data center computing apparatus, and
  both the local device and the shared data center computing apparatus;
 link the shared data center computing apparatus to the local environment for both the first and the second industrial automation system;
 provide, based on the analysis of the segregated data, instructions to at least one client device associated with the local environment;
 provide functional services to a corresponding industrial automation system of the one, two, or more industrial automation systems through the service bus connection; and
 implement system security updates and patch operations, on a scheduled time interval, for equipment associated with the first and the second industrial automation system located at a separate remote location, wherein the shared data center computing apparatus is configured to provide the functional services based upon one or more specified criteria, wherein the shared data center computing apparatus is further configured to allocate a plurality of computing resources to the first and the second industrial automation system based on an efficiency of functions associated with the at least one processing device of the shared data center computing apparatus, the first industrial automation system, and the second industrial automation system, and wherein the shared data center computing apparatus is further configured to reduce and control a number of operator with physical access to the one, two, or more industrial automation system to enhance security of the one, two, or more industrial automation system.

* * * * *